Figure 1:
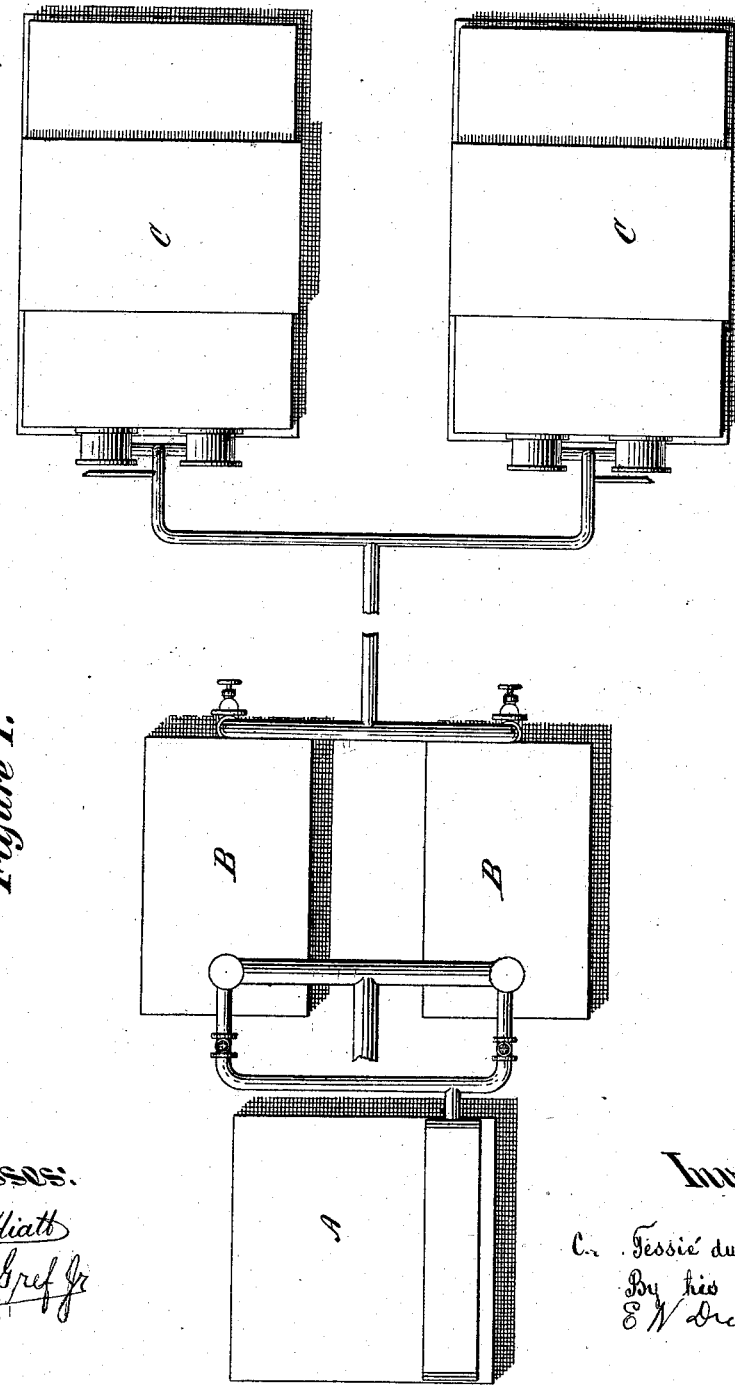

C. TESSIÉ du MOTAY.
Process for the Production of Hydrogen Gas.

No. 229,340. Patented June 29, 1880.

Witnesses:
Geo. H. Hiatt
Anthony Gref Jr

Inventor:
C. Tessié du Motay,
By his Attorney
E. N. Dickerson Jr

5 Sheets—Sheet 2.

C. TESSIÉ du MOTAY.
Process for the Production of Hydrogen Gas.

No. 229,340. Patented June 29, 1880.

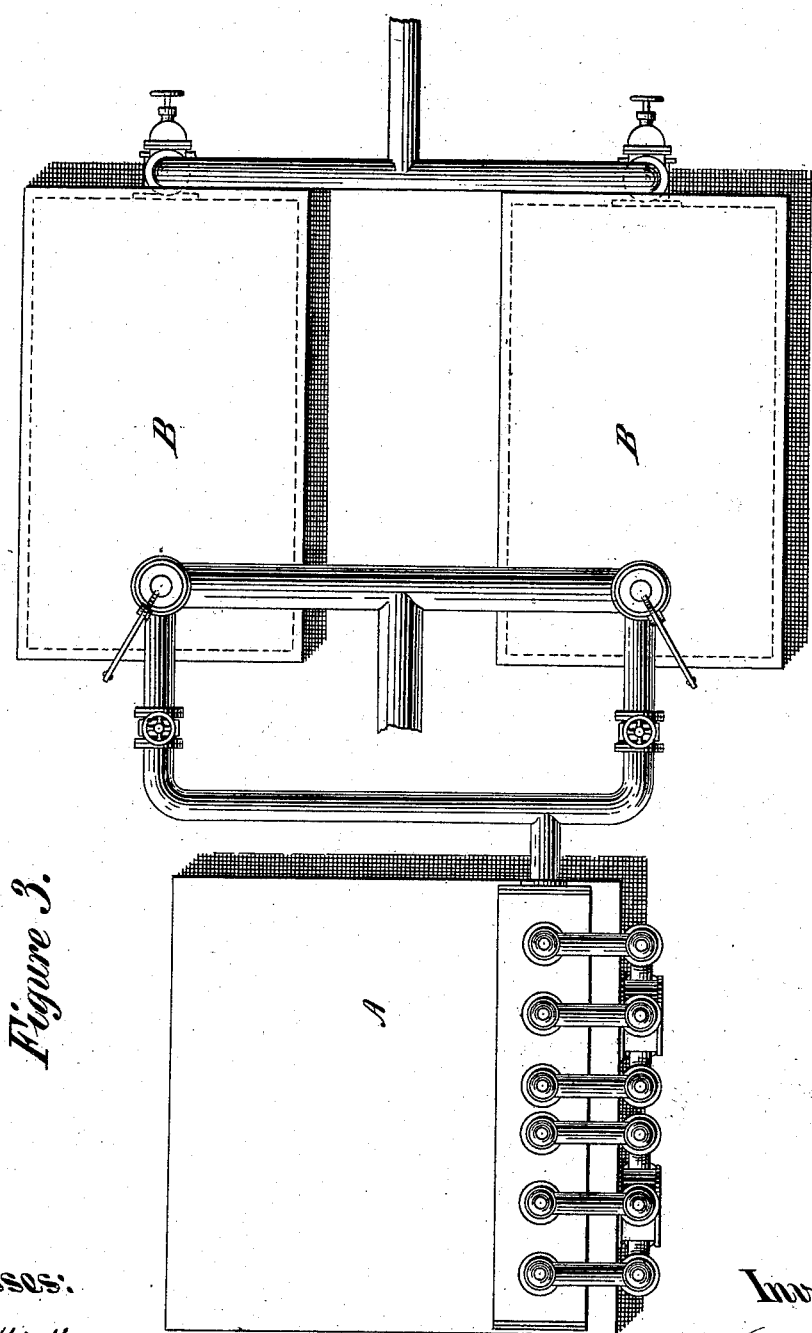

C. TESSIÉ du MOTAY.
Process for the Production of Hydrogen Gas.

No. 229,340. Patented June 29, 1880.

Witnesses:
Geo. W. Miatt
Anthony Greff Jr

Inventor:
C. Tessié du Motay,
By his Attorney
E. N. Dickerson Jr

C. TESSIÉ du MOTAY.
Process for the Production of Hydrogen Gas.
No. 229,340.                    Patented June 29, 1880.
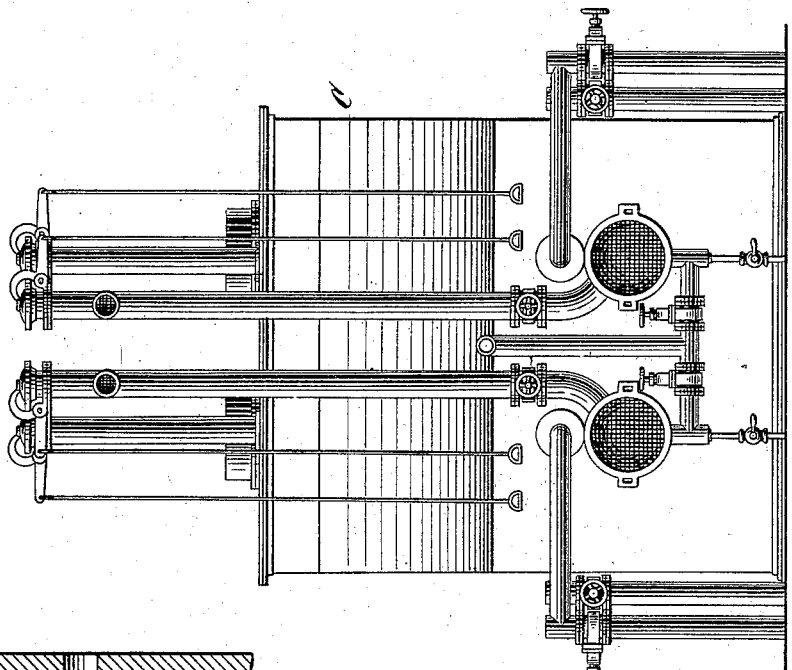
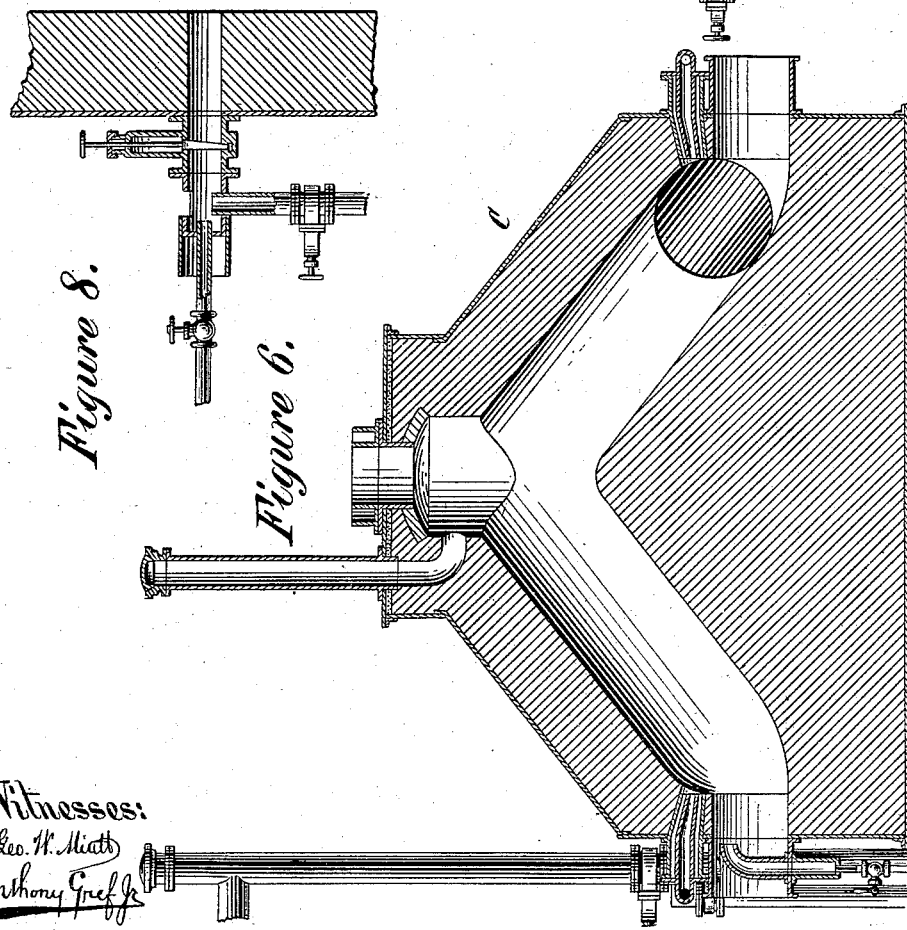

UNITED STATES PATENT OFFICE.

CYPRIEN TESSIÉ DU MOTAY, OF PARIS, FRANCE.

PROCESS FOR THE PRODUCTION OF HYDROGEN GAS.

SPECIFICATION forming part of Letters Patent No. 229,340, dated June 29, 1880.

Application filed July 3, 1879.

*To all whom it may concern:*

Be it known that I, CYPRIEN TESSIÉ DU MOTAY, of Paris, France, resident of the city of New York, N. Y., have invented a new and useful Improvement in Process for the Production of Hydrogen Gas, of which the following is a full, true, and exact description, reference being had to the accompanying drawings.

The process relates to a method of converting coal-gas and steam into hydrogen by means of a converting lime-furnace, and it is carried out by apparatus similar to that for which I have heretofore applied for a patent on the 17th day of May, 1879, and the apparatus shown is partly the same shown in that application, to which I refer for a fuller description of the apparatus there shown and described.

In the process described in this application coal-gas coming from the usual distilling-benches passes into a secondary generator. The coal-gas passing from the benches consists of hydrogen, light carbureted hydrogen, heavy hydrocarbons, tar, hydrocarbons in vaporous form, and other impurities. By passing this mixture through the secondary generator, which contains coal in a highly-heated condition, the heavy hydrocarbons become converted into lighter hydrocarbons and an increase in volume takes place owing to further decomposition of the tars and other vaporous matter carried with the gas. This mingled gas is then passed to a converting lime-furnace, similar to those heretofore described in my previous application, where it enters, together with a jet of steam, preferably superheated, in the second generator. There a conversion takes place in the same manner as before described. The carbonic oxide, being converted into carbonic acid, is subsequently taken up by cooler portions of the lime.

A full description of the apparatus will not be here attempted, it having been already sufficiently described.

In the drawings similar letters refer to similar parts.

Figure 2:
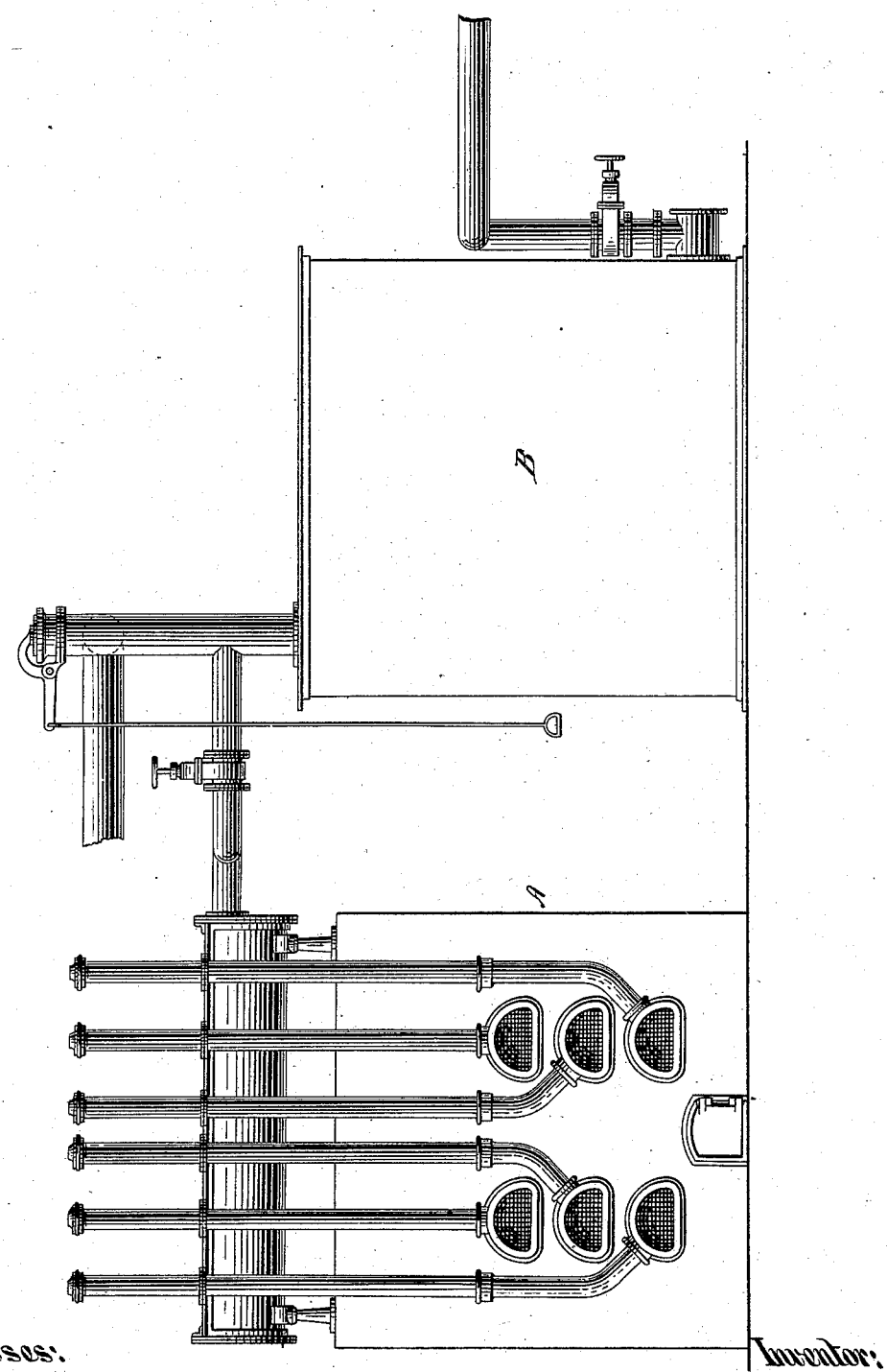
Figure 5:
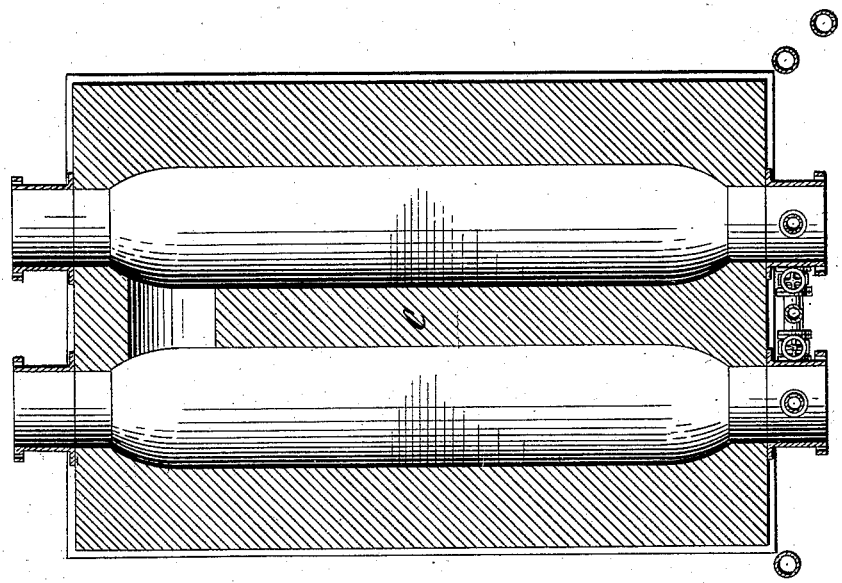
Figure 4:
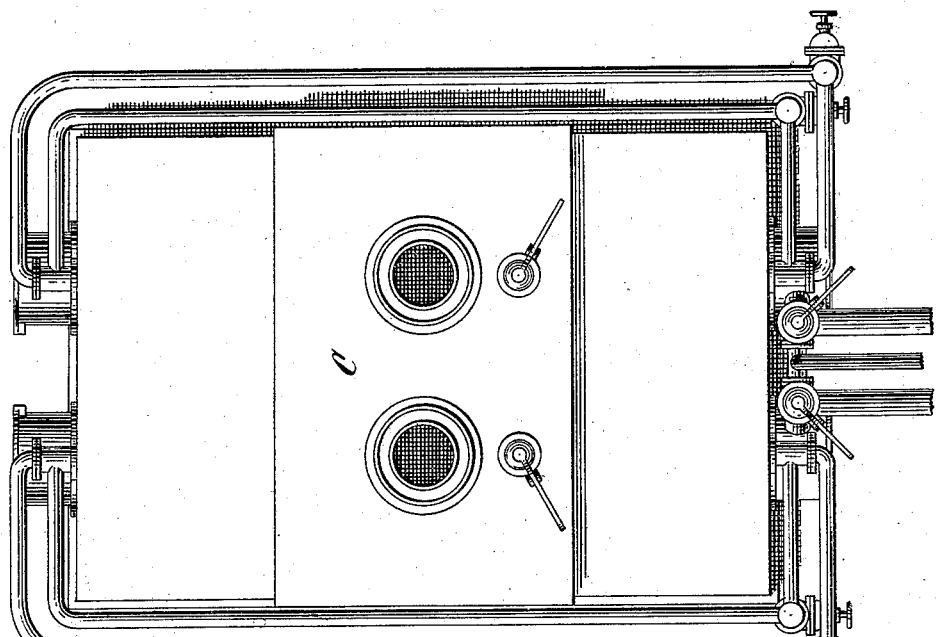

Figure 1 is a plan view of my apparatus; Fig. 2, a view of the ordinary bench of gas-retorts and of the secondary generator; Fig. 3, a plan view of the same. Figs. 4, 5, 6, 7, and 8 are views of the converting lime-furnace similar to those heretofore described.

A represents a view of a bench of gas-retorts. B B represent a supplemental gas-generator; C C, the converting lime-furnaces. The generators B B and the lime-furnace C C are duplicated, so as to make the process continuous.

The generators B B are alternately heated by injected air, thereby producing carbonic oxide, and may be constructed like those heretofore patented to E. J. Jerzmanowski.

The lime-furnaces contain, as before, in one side of the chamber highly-heated lime and in the other cooler lime, and are provided with suitable injection-tubes for injecting the steam, preferably superheated, at the same point where the gas from the supplemental generators passes into such converting lime-furnaces.

The carbonic oxide produced from the generators B B may be used in heating the lime-furnaces in the manner before described.

Suitable valves and connections are, of course, provided, which are not shown in detail, but which are readily supplied.

My process can now be readily understood. The coal-gas containing impurities, as described, passes from the bench A into one of the supplemental generators B, where its volume is increased by the conversion of the vapors and tar, as described, and the heavy hydrocarbon becomes converted into lighter hydrocarbon. This mixture passes to the converting lime-furnaces, where it is joined by a jet of superheated steam, and the whole passes through the converting lime-furnace, and is by it converted into hydrogen in the manner described in the previous application. In this lime-furnace the carbon and hydrogen compounds are first decomposed by contact with highly-heated lime, thereby producing hydrogen in a free—that is, uncombined—state, mixed, however, with carbonic acid. The gaseous products are then passed through lime in a cooler condition, which absorbs the carbonic acid, leaving the hydrogen in a purified condition.

I would observe that heretofore a process has been devised in which coal-gas is passed with steam into a heated chamber containing chalk, and afterward purified in the usual way; and I do not therefore claim such a process. It differs essentially from my invention.

What I claim as my invention, and desire to secure by Letters Patent, is—

1. In the manufacture of hydrogen, the process of producing the same in a free—that is, uncombined—state, which consists in passing a current of coal-gas through a secondary highly-heated generator or heater, whereby the volume of said gas is increased, and then decomposing the hydrogen compounds contained therein, in connection with water-vapor, by passage through heated lime, substantially as described.

2. The process of producing hydrogen, hereinbefore described, which consists of passing a stream of coal-gas through a secondary highly-heated converting-generator, thereby increasing its volume, and subsequently passing said gas through a highly-heated body of lime, decomposing during the passage the hydrogen compounds contained in the gas, in connection with water-vapor, and then passing the resulting products through lime at a lower temperature, substantially as described.

C. TESSIÉ DU MOTAY.

Witnesses:
S. F. SULLIVAN,
W. A. POLLOCK.